United States Patent
Javali et al.

(10) Patent No.: US 10,205,804 B2
(45) Date of Patent: Feb. 12, 2019

(54) METHODS AND SYSTEMS FOR ENHANCED SUPPORT OF TCP OPTIONS IN A TCP SPOOFED SYSTEM

(71) Applicant: Hughes Network Systems, LLC, Germantown, MD (US)

(72) Inventors: Nagesh Javali, Germantown, MD (US); Robert James Torres, New Market, MD (US); John Leonard Border, Middletown, MD (US); Venkat Ganesan, Germantown, MD (US); Zili Qian, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 51 days.

(21) Appl. No.: 15/422,339

(22) Filed: Feb. 1, 2017

(65) Prior Publication Data
US 2018/0219979 A1    Aug. 2, 2018

(51) Int. Cl.
*G06F 15/173*    (2006.01)
*H04L 29/06*    (2006.01)
(Continued)

(52) U.S. Cl.
CPC .............. *H04L 69/16* (2013.01); *H04L 67/02* (2013.01); *H04L 67/28* (2013.01); *H04W 80/06* (2013.01);
(Continued)

(58) Field of Classification Search
CPC ........................................................ H04L 69/16
See application file for complete search history.

(56) References Cited

U.S. PATENT DOCUMENTS

| 7,006,480 B2 | 2/2006 | Border |
| 7,219,158 B2 | 5/2007 | Border |

(Continued)

FOREIGN PATENT DOCUMENTS

| WO | 2005013083 A2 | 2/2005 |
| WO | 2015048999 A1 | 4/2015 |

OTHER PUBLICATIONS

International Search Report and Written Opinion dated Apr. 16, 2018 by the International Searching Authority (European Patent Office) in PCT Application PCT/US2018/016278.

*Primary Examiner* — Normin Abedin
*Assistant Examiner* — Nicholas P Celani
(74) *Attorney, Agent, or Firm* — NovoTechIP International PLLC

(57) ABSTRACT

Methods and systems utilizing receiving, at a first proxy node, a first TCP SYN segment from a first endpoint to establish a TCP connection with a second endpoint, the first TCP SYN segment including a first TCP option having a first option-kind value; transmitting a first spoofed connection request message corresponding to the first TCP SYN segment from the first proxy node to a second proxy node associated with the second endpoint; including, in response to the first TCP option having the first option-kind value, an indication in the first spoofed connection request message that a TCP option having the first option-kind value was included in the first TCP SYN segment; receiving, at the first proxy node, a second TCP SYN segment from a third endpoint to establish a TCP connection with a fourth endpoint, the second TCP SYN segment including a second TCP option having a second option-kind value different from the first option-kind value; transmitting a second spoofed connection request message corresponding to the second TCP SYN segment from the first proxy node to a third proxy node associated with the fourth endpoint; and (Continued)

not including, in response to the second TCP option having the second option-kind value, an indication in the second spoofed connection request message that a TCP option having the second option-kind value was included in the second TCP SYN segment.

17 Claims, 7 Drawing Sheets

(51) Int. Cl.
 *H04L 29/08* (2006.01)
 *H04W 80/06* (2009.01)
(52) U.S. Cl.
 CPC ..... *H04L 29/06115* (2013.01); *H04L 67/2876* (2013.01); *H04L 69/161* (2013.01); *H04L 69/163* (2013.01); *H04L 69/22* (2013.01); *H04L 69/326* (2013.01)

(56) References Cited

U.S. PATENT DOCUMENTS

| | | |
|---|---|---|
| 7,389,533 B2 | 6/2008 | Bartlett |
| 8,140,687 B2 | 3/2012 | Roy |
| 8,660,006 B2 | 2/2014 | Torres |
| 8,675,486 B2 | 3/2014 | Friedman |
| 8,705,357 B2 | 4/2014 | Torres |
| 9,240,950 B2 | 1/2016 | Vedula |
| 2002/0133596 A1 | 9/2002 | Border et al. |
| 2007/0239886 A1 | 10/2007 | Montemayor et al. |
| 2012/0173759 A1 | 7/2012 | Agarwal et al. |
| 2015/0381752 A1 | 12/2015 | Torres |
| 2016/0094467 A1 | 3/2016 | Hong |
| 2016/0119903 A1* | 4/2016 | Skog ............... H04L 65/4084 370/329 |

\* cited by examiner

METHODS AND SYSTEMS FOR ENHANCED SUPPORT OF TCP OPTIONS IN A TCP SPOOFED SYSTEM

BACKGROUND

1. Field of the Invention

The following description relates to a communication system, and is more particularly related to a proxy architecture for improving network performance.

2. Discussion of the Background

The entrenchment of data networking into the routines of modern society, as evidenced by the prevalence of the Internet, particularly the World Wide Web, has placed ever-growing demands on service providers to continually improve network performance. To meet this challenge, service providers have invested heavily in upgrading their networks to increase system capacity (i.e., bandwidth). In many circumstances, such upgrades may not be feasible economically or the physical constraints of the communication system does not permit simply "upgrading." Accordingly, service providers have also invested in developing techniques to optimize the performance of their networks. Because much of today's networks are either operating with or are required to interface with the Transmission Control Protocol/Internet Protocol (TCP/IP) suite, attention has been focused on optimizing TCP/IP based networking operations.

As the networking standard for the global Internet, TCP/IP has earned such acceptance among the industry because of its flexibility and rich heritage in the research community. The transmission control protocol (TCP) is the dominant protocol in use today on the Internet. TCP is carried by the Internet protocol (IP) and is used in a variety of applications including reliable file transfer and Internet web page access applications. TCP provides reliable, in-sequence delivery of data between two IP hosts. The IP hosts set up a TCP connection, using a conventional TCP three-way handshake and then transfer data using a window based protocol with the successfully received data acknowledged.

A Performance Enhancing Proxy (PEP) may be employed to improve the performance of Internet protocols on network paths where native performance suffers due to characteristics (such as latency of a satellite network) of a link or sub-network on the path. Further, in many Internet and intranet applications that employ TCP as the transport layer protocol, the link characteristics of the environment limit the performance of TCP and other higher layer protocols. In such cases, PEP process may be employed at the transport layer (a Transport Layer PEP), where such Transport Layer PEPs typically let the application protocol operate end-to-end without modifying the application protocol in any way (e.g., a PEP implementation that interacts with TCP layer or a TCP PEP). For example, in an environment with a large bandwidth-delay product (for example, a satellite network), a TCP PEP may be used to alter the behavior of the TCP connection by generating "local acknowledgments," and thereby eliminate the multi-step handshake process by spoofing transport layer handshake messages to the client applications, in order to improve the throughput of the respective connection. As a further example, a Split Connection PEP implementation may be employed, which terminates the TCP connection received from an endpoint (forming a first "leg" of the split TCP connection) and establishes a corresponding TCP connection to the other endpoint of the TCP connection (forming a second leg of the split TCP connection). In a distributed PEP implementation, this is typically done to allow the use of a third connection between two PEPs optimized for the link (forming a third leg of the split TCP connection that links the first and second legs). The Internet Engineering Task Force (IETF), Request for Comments (RFC) No. 3135, "Performance Enhancing Proxies Intended to Mitigate Link-Related Degradations" (June 2001), provides a more detailed description of TCP Spoofing and Split Connection PEP implementation, the entirety of which is incorporated herein by reference.

Various examples of Transport Layer PEPs, such as TCP PEPs, are illustrated in U.S. Pat. No. 7,006,480 (entitled "Method and System for Using a Backbone Protocol to Improve Network Performance" and issued on Feb. 28, 2006), U.S. Pat. No. 7,219,158 (entitled "Method and System for Improving Network Performance Using a Performance Enhancing Proxy" and issued on May 15, 2007), U.S. Pat. No. 7,389,533 (entitled "Method and System for Adaptively Applying Performance Enhancing Functions" and issued on Jun. 17, 2008), U.S. Pat. No. 8,140,687 (entitled "Performance Enhancing Proxy Handover" and issued on Mar. 20, 2012), U.S. Pat. No. 8,660,006 (entitled "Method and System for Traffic Management and Resource Allocation on a Shared Access Network" and issued on Feb. 25, 2014), U.S. Pat. No. 8,675,486 (entitled "Method and System for Efficient Flow Control in a Spot Beam Satellite System" and issued on Mar. 18, 2014), U.S. Pat. No. 8,705,357 (entitled "Method and System for Controlling TCP Traffic with Random Early Detection and Window Size Adjustments" and issued on Apr. 22, 2014), U.S. Pat. No. 8,929,217 (entitled "Method and System for Traffic Management and Resource Allocation on a Shared Access Network"), U.S. Pat. No. 9,240,950 (entitled "System and Method for Providing Quality of Service Over Dedicated Local Loop Networks" and issued on Jan. 19, 2016), U.S. Patent App. Pub. No. 2015/0381752 (entitled "Dynamic Disabling of Multi-Step Transport Layer Handshake Spoofing in Performance Enhancing Proxies (PEPs) in Broadband Networks" and published on Dec. 31, 2015), and U.S. Patent App. Pub. No. 2016/0094467 (entitled "Application Aware Multihoming for Data Traffic Acceleration in Data Communications Networks"), each of which is incorporated by reference herein in their entireties.

TCP segments, such as, for example, the TCP SYN, TCP SYN-ACK, and TCP data segments illustrated in FIGS. 3B and 3C, may include the selection of one or more TCP options, which are specified in a TCP options field within the TCP header portion of the TCP segments. The TCP options field may encode multiple TCP options, each formatted to include up to three fields: an option-kind field (1 byte, indicating a kind or type for the TCP option), an option-length field (1 byte, indicating a number of bytes used to encode the TCP option), and an optional option-data portion (variable length). For example, IANA (Internet Assigned Numbers Authority) recognized TCP options include, but are not limited to, a Maximum Segment Size (MSS) option (option-kind 2) to set the MSS to a value other than the default, a Window Scaling option (option-kind 3), selective acknowledgment (SACK) related options (option-kinds 4 and 5), and no-operation (NOP) option (option-kind 1). The Maximum Segment Size (MSS) option is used to define the maximum segment that will be used during a connection between two hosts (discussed in further detail above). The MSS TCP Option occupies 4 bytes of length (one byte for the option-kind, one byte for the option-length and two bytes for the option-data specifying the MSS size). The Window Scaling option is used as an extension of the Window field of the TCP header—because the TCP header Window field is 2 bytes (16 bits), the largest possible value of the Window field is only 65,535 bytes (64 KB). The Window Scaling TCP option adds additional bits to for window sizing, which facilitates a scaling or increase of the TCP window size beyond 65,536 bytes. The SACK option facilitates the selective acknowledgment of specific bytes. With this TCP option, when segments arrive at a destination endpoint out of order, the destination endpoint can selectively acknowledge the bytes that it has received. For example, if a destination endpoint is waiting to receive byte 4,268, but indicates in a SACK TCP option that the destination endpoint successfully received bytes 7,080 through 8,486, a source endpoint is able to recognize that the target is missing bytes 4,268 through 7,079, and thus can resend the missing 2,810 bytes, and not also resend bytes 7,080 through 8,486. IETF RFC Nos. 793 ("Transmission Control Protocol"), 2018 ("TCP Selective Acknowledgment Options"), 4727 ("Experimental Values in IPv4, IPv6, ICMPv4, ICMPv6, UDP, and TCP Headers"), 4782 ("Quick-Start for TCP and IP"), 5482 ("TCP User Timeout Option"), 5925 ("The TCP Authentication Option"), 5247 ("Moving the Undeployed TCP Extensions RFC 1072, RFC 1106, RFC 1110, RFC 1145, RFC 1146, RFC 1379, RFC 1644, and RFC 1693 to Historic Status"), 6691 ("TCP Options and Maximum Segment Size (MSS)"), 6824 ("TCP Extensions for Multipath Operation with Multiple Addresses"), 6694 ("Shared Use of Experimental TCP Options"), 7323 ("TCP Extensions for High Performance"), 7413 ("TCP Fast Open"), and 7974 ("An Experimental TCP Option for Host Identification") and IETF Internet Drafts draft-ietf-tcpm-tcp-edo-07 ("TCP Extended Data Offset Option"), draft-boucadair-tcpm-capability-option-01 ("TCP Capability Option"), draft-ietf-tcpinc-tcpeno-06 ("TCP-ENO: Encryption Negotiation Option"), and draft-touch-tcpm-sno-06 ("The TCP Service Number Option (SNO)") describe various TCP options, and are each incorporated by reference herein in their entireties. Conventional TCP proxies often perform no or little handling of TCP options or introduce effects on TCP options, which can result in loss of benefits offered by various TCP options, failures in establishing or maintaining TCP connections, or undesired transport- or application-level behavior (for example, unintended changes in TCP adaptive behavior) resulting from how a TCP proxy handles various TCP options.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
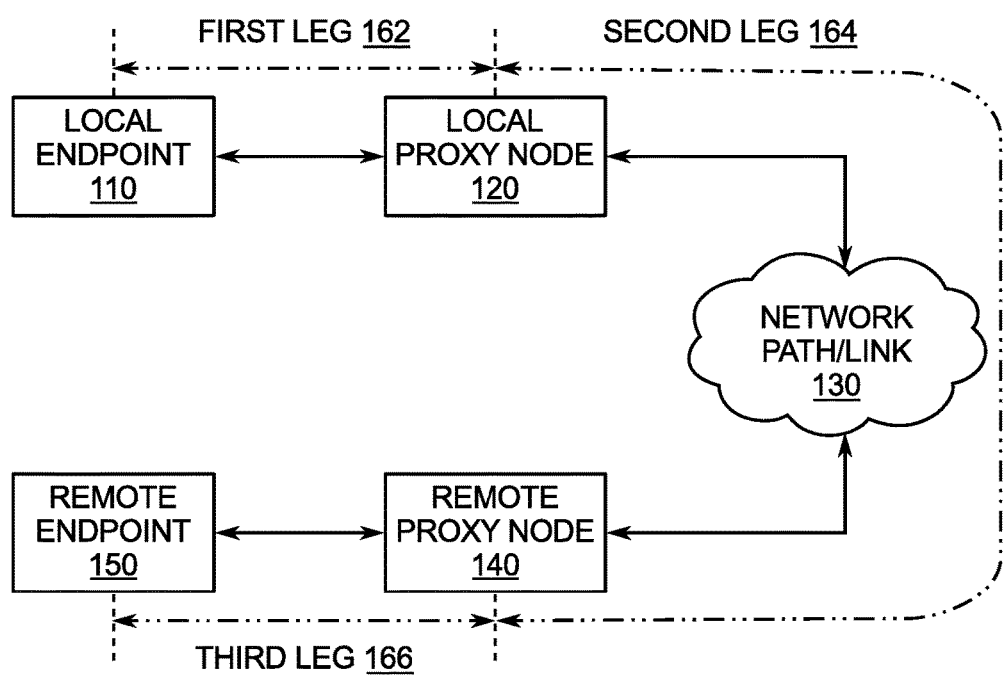
FIG. 1 illustrates a block diagram depicting portions of a communications network implementing enhanced selective proxying of TCP options.

FIG. 1 illustrates a block diagram depicting portions of a communications network implementing enhanced selective proxying of TCP options, in accordance with example embodiments of the present invention. With reference to FIG. 1, a local proxy node 120 receives application messaging from a local endpoint (for example, a laptop computer, a desktop computer, or a smartphone) 110. The messaging relates to establishment of connections across the network 130 (for example, TCP connections for application data communications between the local endpoint 110 and a remote endpoint 150), and application session communications over established connections (for example, for a web browsing session, where the local endpoint 110 hosts a web browser application and the remote endpoint 150 hosts a web server application providing one or more web-based resource being accessed by the web browsing application). A connection across the network 130, for example, employs a performance enhancing proxy protocol that operates via the local proxy node 120 and a remote proxy node 140 associated with the remote endpoint 150. The local proxy node 120 and remote proxy node 140 may implement portions of TCP PEP (performance enhancing proxy) proxies, dividing a TCP connection established between the local endpoint 110 and the remote endpoint 150 into three legs: a first local leg 162 between local endpoint 110 and local proxy node 120, using the TCP protocol; a second leg 164 between the local proxy node 120 and the remote proxy node 140 via network 130, using a proxying protocol; and a leg remote leg 166 between the remote proxy node 140 and the remote endpoint 150, using the TCP protocol. For purposes of this disclosure, the term "local," such as in the local endpoint 110 and the local proxy node 120, will be used in connection with the endpoint that initiates a transport layer connection; in other words, local endpoint 110 initiates a process of establishing a transport layer connection between local endpoint 110 and remote endpoint 150. Accordingly, in some circumstances an endpoint may be considered a "local endpoint" for a first transport layer connection, but a "remote endpoint" for a second transport layer connection.

Figure 2:
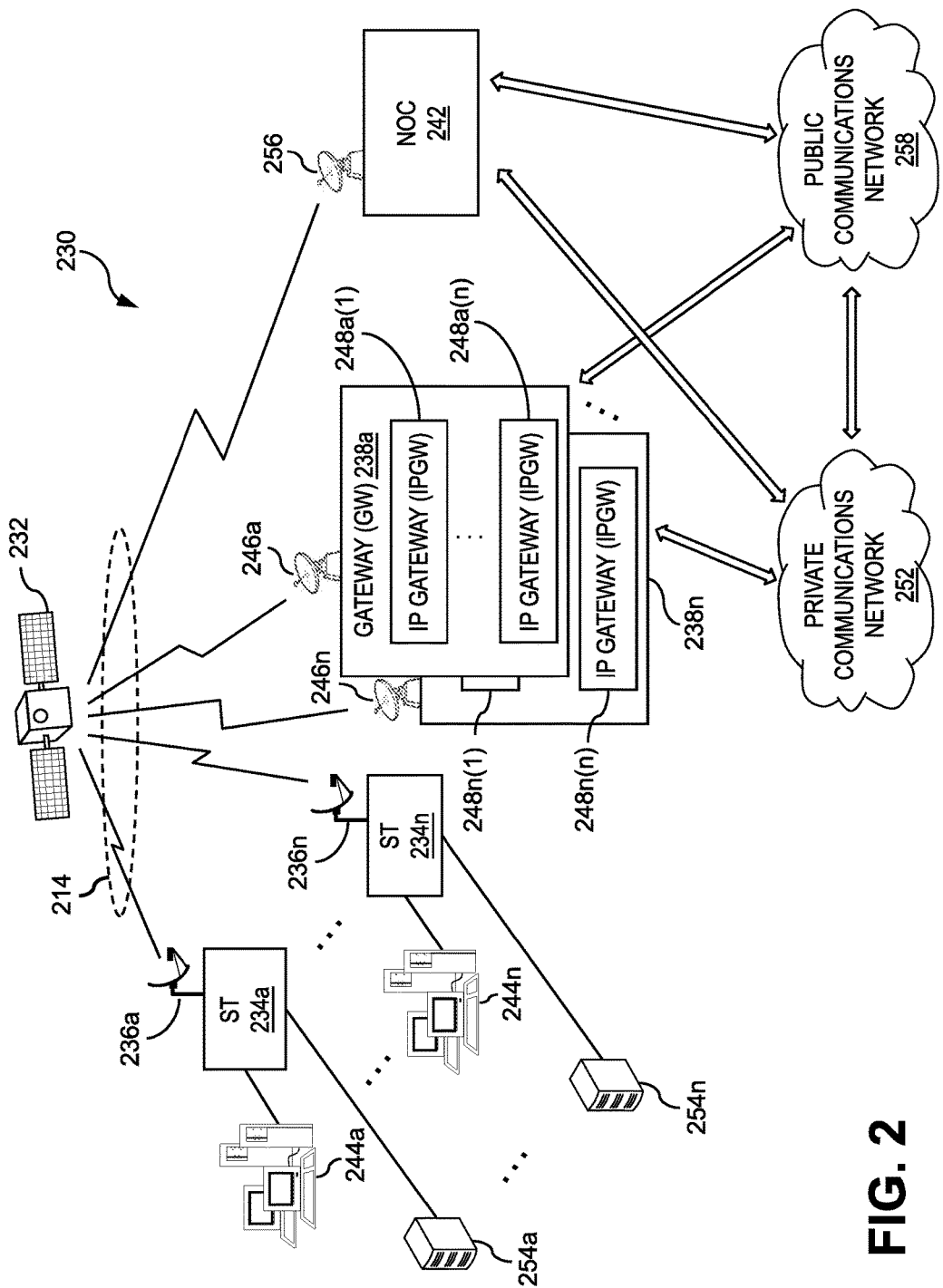
FIG. 2 illustrates an example satellite communications system.

FIG. 2 illustrates an example satellite communications system 230, according to example embodiments. Satellite communications system 230 includes a satellite 232 that supports communications among multiple satellite terminals (STs) 234a to 234n (with "n" indicating an arbitrary number which may be a different number for each "n" illustrated in FIG. 2, such as, 236n, 238n, 244n, 246n, 248a(n), 248n(n), and 254n), a number of gateways (GWs) 238a to 238n, and a network operations center (NOC) 242. The STs, GWs, and NOC transmit and receive signals via the antennas 236a to 236n, 246a to 246n, and 256, respectively. According to different embodiments, the NOC 242 may reside at a separate site reachable via a separate satellite channel or may reside within a GW site. The NOC 242 performs the management plane functions of the system 230, while the GWs 238a to 238n perform the data plane functions of the system 230. For example, the NOC 242 performs such functions as network management and configuration, software downloads (for example, to the STs 234a to 234n), status monitoring, statistics functions (e.g., collection, aggregation and reporting), security functions (for example, key generation, management and distribution), ST registration and authentication, and GW diversity management. The NOC 242 communicates with each GW via the satellite 232, or via a secure private communications network 252 (for example, an IPsec tunnel over a dedicated link or a virtual private network (VPN) or IPsec tunnel through a public network, such as the Internet). It should be noted that, according to one example embodiment, the message classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 238a to 238n include one or more IP gateways (IPGWs)—whereby the data plane functions are divided between a GW and its respective IPGWs. For example, GW 238a includes IPGWs 248a(1) to 248a(n) and GW 238n includes IPGWs 248n(1) to 248n(n). A GW may perform such functions as link layer and physical layer outroute coding and modulation (for example, DVB S2 adaptive coding and modulation), link layer and physical layer inroute handling (for example, IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (for example, TCP performance enhancing proxies, such as TCP spoofing), HTTP proxy functions, quality of service functions (for example, classification, prioritization, differentiation, random early detection (RED), TCP/UDP flow control), bandwidth usage policing, dynamic load balancing, and routing. Accordingly, the TCP PEP and HTTP proxies are located at the satellite gateway. Further, a GW and respective IPGW may be collocated with the NOC 242. The STs 234a to 234n provide connectivity for one or more endpoints, such as hosts 244a to 244n and/or routers 254a to 254n, respectively. The satellite communications system 230 may operate as a bent pipe system, where the satellite essentially operates as a repeater or bent pipe. Alternatively, the system 230 may employ a switching or processing satellite supporting mesh communications (point to point communications directly between, for example, the two STs 234a and 234n).

In a bent pipe system of an example embodiment, the satellite 232 operates as a repeater or bent pipe, and communications to and from the STs 234a to 234n are transmitted over the satellite 232 to and from respective IPGWs associated with particular STs. Further, in a spot beam system, any one spot beam operates as a bent pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 332, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (for example, based on population densities and the geographic distribution of the STs), locations of available terrestrial data centers (for example, terrestrial data trunks for access to public and private dedicated networks).

Figure 3A:
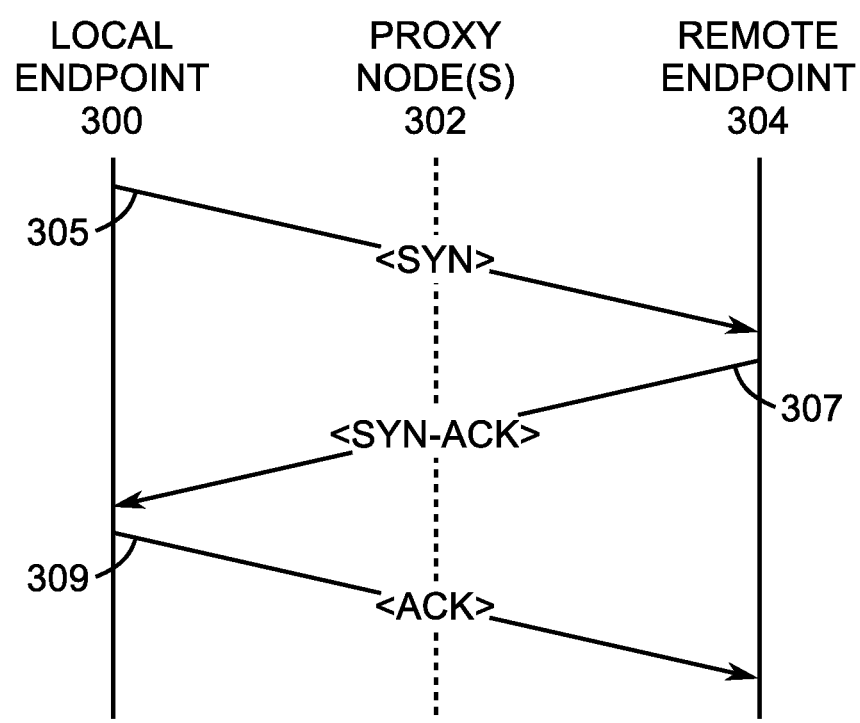
FIG. 3A illustrates a ladder diagram depicting a three-way handshake process for establishing an unspoofed TCP connection between two endpoints.

FIG. 3A illustrates a ladder diagram depicting a three-way handshake process for establishing an unspoofed TCP connection between two endpoints 300 and 304. In the example illustrated in FIG. 3A, the TCP connection being established is "unspoofed," with TCP proxy node(s) 302 merely forwarding TCP segments between the two endpoints 300 and 304. Local endpoint 300 first sends a TCP synchronize (SYN) segment 305 to remote endpoint 304, and remote endpoint 304 responds with a synchronize-acknowledgement (SYN-ACK) segment 307. When local endpoint 300 receives the SYN-ACK segment 307 from remote endpoint 304, local endpoint 300 then sends back an acknowledge (ACK) segment 309, which completes the three-way handshake set-up of the respective TCP connection between local endpoint 300 and remote endpoint 304. SYN and ACK segments are indicated by setting either a SYN bit or an ACK bit in the TCP header, respectively, and the SYN-ACK message has both the SYN and the ACK bits set in the TCP header. When the communication between the two endpoints via this connection ends, another three-way communication may be performed to tear down the TCP connection. TCP also acknowledges that data is successfully received and guarantees the data is reassembled in the correct order.

Figure 3B:
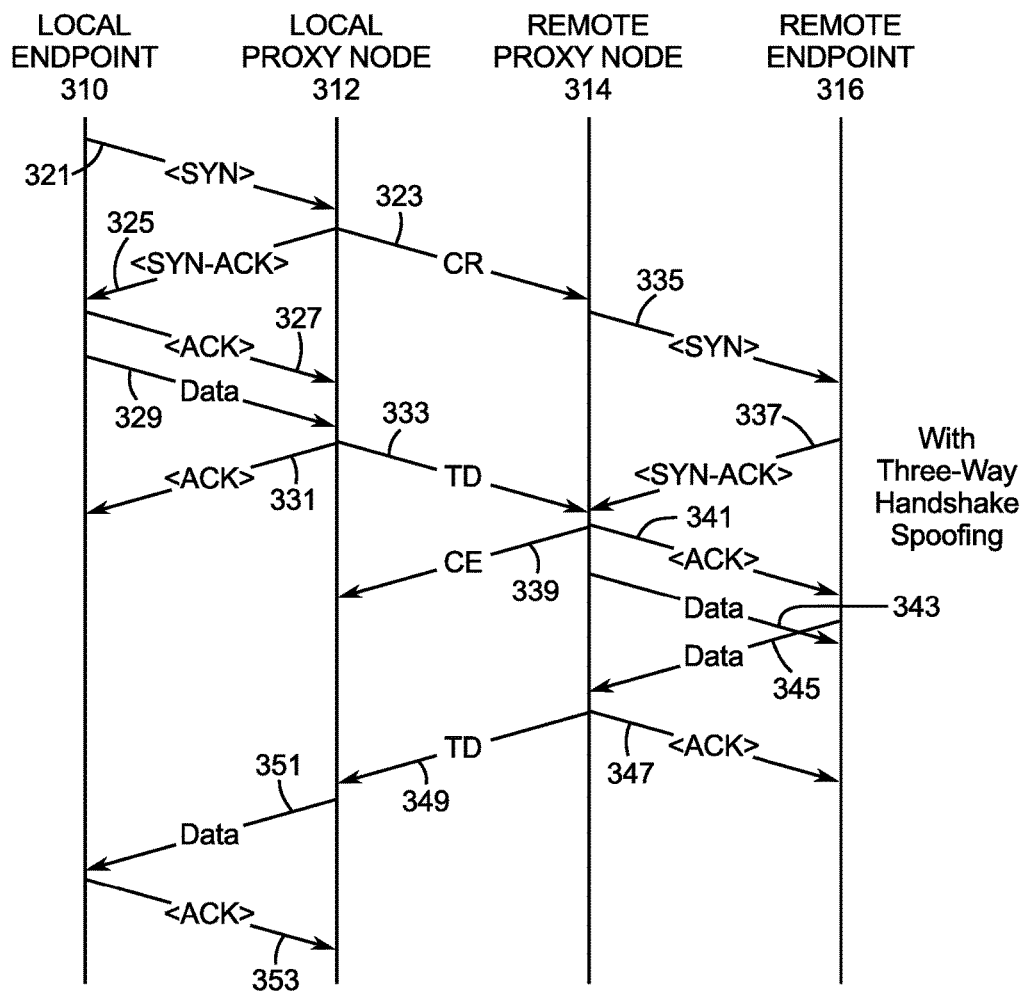
FIGS. 3B and 3C show flow diagrams of the establishment of a spoofed TCP connection between two endpoints utilizing three-way handshake spoofing (3WHS) and without three-way handshake spoofing, respectively.
Figure 3C:
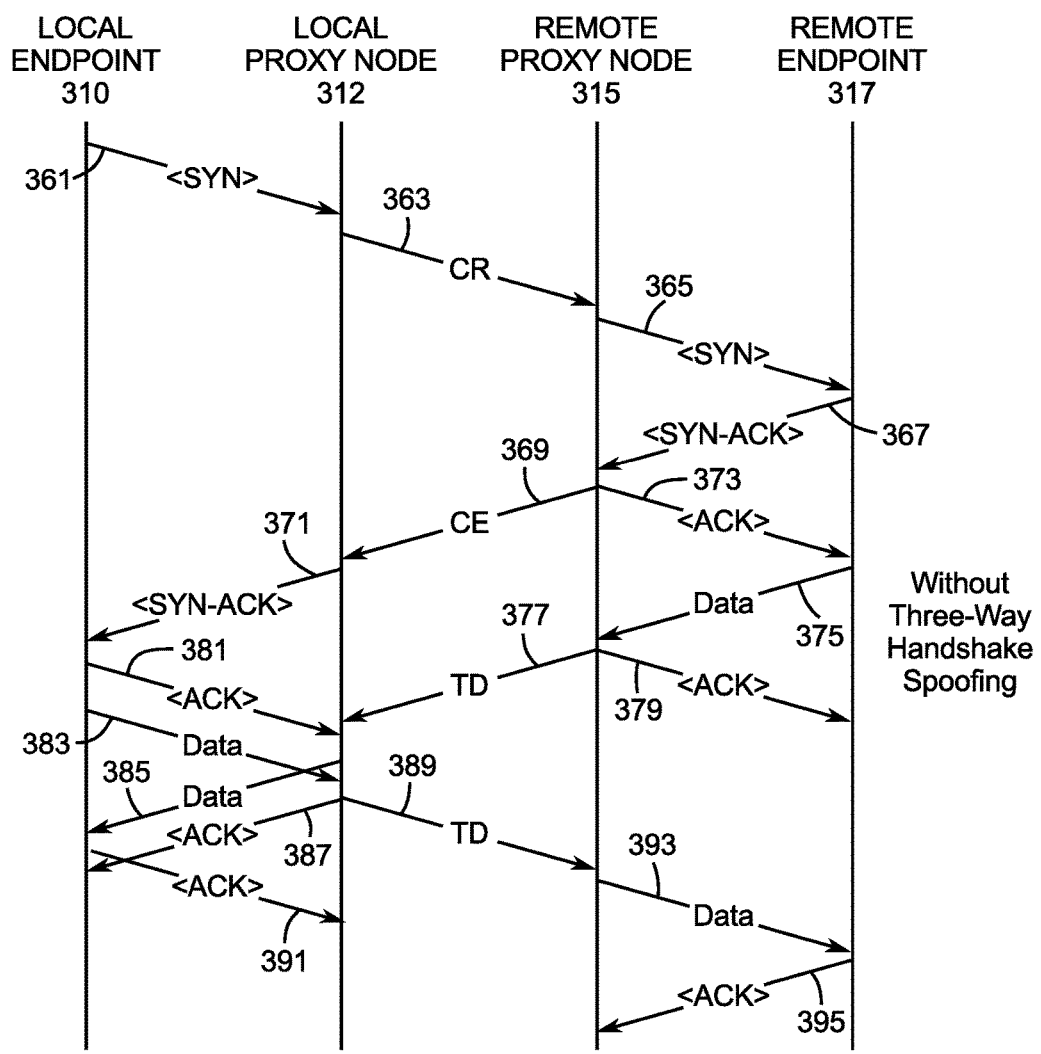

FIGS. 3B and 3C show flow diagrams of the establishment of a spoofed TCP connection between two endpoints utilizing three-way handshake spoofing (3WHS) and without three-way handshake spoofing, respectively. In FIG. 3B, the local endpoint 310 transmits a TCP SYN segment to the local proxy node 312 via a local network connection between the two (step 321). Among other things, the TCP SYN segment identifies a source address, a source port, a destination address (corresponding to remote endpoint 316), and a remote port. When local proxy node 312 receives a TCP SYN segment via the local network connection for a new TCP connection, the local proxy node 312 determines if the connection should be spoofed. In both of the examples illustrated in FIGS. 3B and 3C, a determination is made to spoof the new TCP connection. Additionally, when local proxy node 312 receives a TCP SYN segment via the local network connection for a new TCP connection, the local proxy node 312 determines if three-way handshake spoofing should be performed. Examples of how the local proxy node 312 may determine whether to spoof a new TCP connection are discussed below. Examples of how the local proxy node 312 may determine whether to enable or disable TCP three-way handshake spoofing are also discussed below.

FIG. 3B illustrates an example in which local proxy node 312 determines that three-way handshake spoofing will be performed; FIG. 3C illustrates an example in which local proxy node 312 determines that three-way handshake spoofing will not be performed. Having determined the new TCP connection will be spoofed, local proxy node 312 constructs a Connection Request (CR) message, per step 323, and sends the CR message to its remote proxy node peer for the new TCP connection, remote proxy node 314. The CR message is formatted and transmitted according to a proxying protocol used between local proxy node 312 and remote proxy node 314, and not exposed to local endpoint 310 or remote endpoint 316. The CR message contains all of the information that remote proxy node 314 requires to appropriately establish a new TCP connection with remote endpoint 316, and may indicate that three-way handshake spoofing is enabled for the new TCP connection.

Having determined that TCP three-way handshake spoofing will be performed, without waiting for a response to the CR Message from remote proxy node 314, the local proxy node 312 sends a TCP SYN-ACK segment to the local endpoint 310 in response to the TCP SYN segment received, per step 325. In contrast, FIG. 3C illustrates an example in which TCP three-way handshake spoofing is disabled, and accordingly local proxy node 312 does not send a TCP SYN-ACK segment to local endpoint 310 until it receives a corresponding Connection Established (CE) message.

After sending the TCP SYN-ACK segment (step 325), the local proxy node 312 is ready to start accepting data for the new TCP connection from the local endpoint 310. In step 327, the local endpoint 310 transmits a TCP ACK segment, which is received by the local proxy node 312; thereafter, the local endpoint 310, as in step 329, transmits one or more TCP data segments for the TCP connection, which are also received by the local proxy node 312. When, as illustrated in FIG. 3B, three-way handshake spoofing is being used, local proxy node 312 does not need to wait for a Connection Established (CE) message to arrive from its remote peer, remote proxy node 314, before accepting and forwarding data to remote proxy node 314 for the TCP connection. As illustrated in FIG. 3B, in step 331, in response to the TCP data segment received at step 329, local proxy node 312 sends a TCP ACK segment to the local endpoint 310 to complete the TCP three-way handshake with local endpoint 310, and simultaneously constructs a TCP Data (TD) message and sends the TD message (per step 333) to remote proxy node 314 prior to receiving a CE message from remote proxy node 314. The TD message is formatted and transmitted according to a proxying protocol used between local proxy node 312 and remote proxy node 314.

When the CR message is received from local proxy node 312 (step 323), remote proxy node 314 uses this information to generate a corresponding TCP SYN segment, as in step 335, to send to the remote endpoint 316 for the new TCP connection. When the remote endpoint 316 responds with a TCP SYN-ACK segment (step 337), remote proxy node 314 sends a Connection Established (CE) message to local proxy node 312 (step 339). The CE message is formatted and transmitted according to a proxying protocol used between local proxy node 312 and remote proxy node 314. Remote proxy node 314 also responds, as in step 341, with a TCP ACK segment to complete the TCP three-way handshake with remote endpoint 316.

At this point, all three legs for the spoofed TCP connection—a first local leg using the TCP protocol between local endpoint 310 and local proxy node 312, a second leg using the proxying protocol between local proxy node 312 and remote proxy node 314, and a third leg using the TCP protocol between remote proxy node 314 and remote endpoint 316—have been established and data may be transferred in either direction between local endpoint 310 and remote endpoint 316. The remote proxy node 314 then forwards the data received via the TD message at step 333 in one or more TCP data segments to remote endpoint 316, per step 343. Concurrently, in step 345, the remote endpoint 316 sends a TCP data segment for the TCP connection to the remote proxy node 314, which acknowledges receipt of the data by issuing a TCP ACK segment to the remote endpoint 316, per step 347. Simultaneously with the acknowledgement, remote proxy node 314 sends the data to local proxy node 312 in a respective TD message (step 349). The local proxy node 312 forwards the data, as in step 351, to the local endpoint 310, which, in turn, sends a TCP ACK segment (step 353).

Turning now to FIG. 3C, a spoofed TCP connection is established between two endpoints 310 and 317 with TCP three-way handshake spoofing disabled. In the example illustrated in FIG. 3C, the local endpoint 310 transmits a TCP SYN segment to the local proxy node 312 via a local network connection between the two (step 321), much as discussed for step 321 in FIG. 3B. However, in this example, the local proxy node 312 determines that TCP three-way handshake spoofing is disabled for this TCP connection. As a result, unlike the TCP connection establishment of FIG. 3B, the local proxy node 312 does not immediately respond to the a TCP SYN segment with a SYN-ACK segment, but constructs a CR message, per step 363, and sends the CR message to its peer for the new TCP connection, remote proxy node 314. The CR message is formatted and transmitted according to the proxying protocol used between local proxy node 312 and remote proxy node 315, and not exposed to local endpoint 310 or remote endpoint 317. The CR message contains all of the information that remote proxy node 315 requires to appropriately establish a new TCP connection with remote endpoint 317, and may indicate that three-way handshake spoofing is disabled for the new TCP connection. The local proxy node 312 waits to receive a CE message corresponding to the CR message sent in step 363 before sending a TCP SYN-ACK segment corresponding to the TCP SYN segment received at step 361.

Next, in step 365, remote proxy node 315 sends a TCP SYN segment to the remote endpoint 317. In response, the remote endpoint 317 transmit a TCP SYN-ACK segment back to the remote proxy node 315 (per step 367). In response to receiving the TCP SYN segment, the remote proxy node 315, as in step 369, sends a CE message to the local proxy node 312. The CE message may include information responsive to information received in the TCP SYN-ACK segment, such as, but not limited to, TCP option-related information. In response to receiving the CE message, the local proxy node 312 issues a SYN-ACK segment to the local endpoint 310, per step 371. Simultaneous with step 369, the remote may also send a TCP ACK segment to the remote endpoint 317 to complete the TCP three-way handshake with remote endpoint 317 (step 373). Because the local endpoint 310 has received the TCP SYN-ACK segment from the local proxy node 312, the local endpoint 310 acknowledges the TCP SYN-ACK segment with a TCP ACK segment, per step 381.

At this point, all three legs for the spoofed TCP connection—a first local leg using the TCP protocol between local endpoint 310 and local proxy node 312, a second leg using the proxying protocol between local proxy node 312 and remote proxy node 315, and a third leg using the TCP protocol between remote proxy node 315 and remote endpoint 317—have been established and data may be transferred in either direction between local endpoint 310 and remote endpoint 317. After receiving the TCP ACK segment, the remote endpoint 317 may begin transmitting data on the established TCP connection via one or more TCP data segments received by remote proxy node 315, as in step 375. In response to receiving a TCP data segment from the remote endpoint 317, the remote proxy node 315 may simultaneously transmit a corresponding TD message to the local proxy node 312 (step 377) and transmit a TCP ACK segment to the remote endpoint 317 to acknowledge receipt of the data (step 379). After sending the TCP ACK segment to the local proxy node 312 (step 381), the local endpoint 310 may begin transmitting data on the established TCP connection via one or more TCP data segments received by local proxy node 312 (step 383). In response to receiving a TCP data segment from the local endpoint 310, the local proxy node 312 may simultaneously transmit a corresponding TD message to the remote proxy node 315 (step 389) and transmit a TCP ACK segment to the local endpoint 310 to acknowledge receipt of the data (step 387).

In the example illustrated in FIG. 3C, before the local proxy node 312 receives the data from the local endpoint 310, the local proxy node 312 provides the data that originated from the remote endpoint 317 received by the local proxy node 312 via the TD message (step 377) to the local endpoint 310 in one or more TCP data segments, per step 385. The local endpoint 310 acknowledges the TCP data segment of step 385 by sending a TCP ACK segment received by local proxy node 312 (step 391). The remote proxy node 315 provides the data that originated from the local endpoint 310 received by the remote proxy node 315 via the TD message (step 389) to the remote endpoint 317 in one or more TCP data segments, per step 393. The remote endpoint 317 acknowledges the TCP data segment of step 393 by sending a TCP ACK segment received by remote proxy node 315 (step 395).

Figure 4:
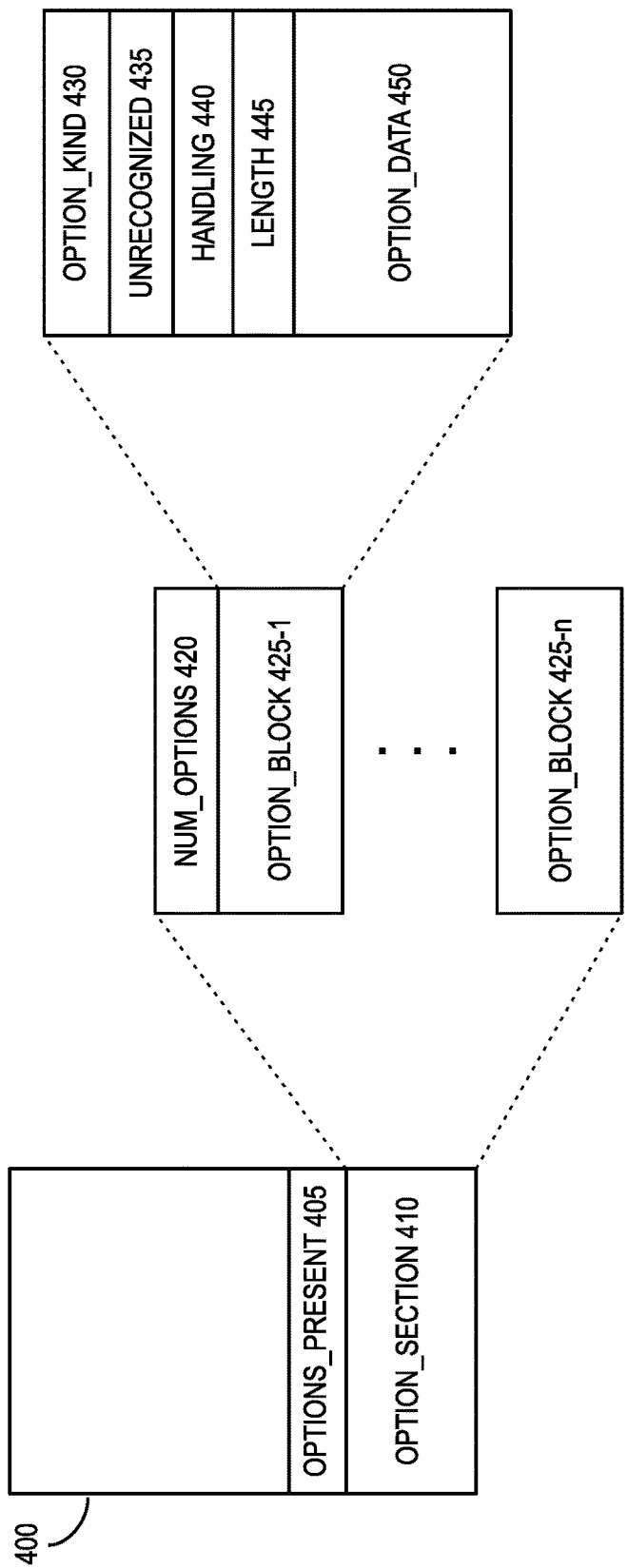
FIG. 4 illustrates an example of an approach for encoding TCP options information in messages for a proxying protocol, such as the proxying protocol discussed in connection with FIGS. 3B and 3C.

FIG. 4 illustrates an example of an approach for encoding TCP options information in messages for a proxying protocol, such as the proxying protocol discussed in connection with FIGS. 3B and 3C. FIG. 4 illustrates a message 400. Examples of message 400 include, but are not limited to, the Connection Request (CR) messages of steps 323 and/or 363, the Connection Established (CE) messages of steps 339 and/or 369, and the TCP Data (TD) messages of steps 333, 349, 377, and/or 389. Another example may be a TCP Urgent Data Message (UD) used for spoofing TCP urgent data segments. In some implementations, message 400 may include an OPTIONS_PRESENT field 405 used to indicate whether the message 400 includes an OPTION_SECTION portion 410. The OPTIONS_PRESENT field 405 may be encoded in various ways, including an implicit encoding (such as, but not limited to, a protocol version number being greater than or equal to a predetermined value, or a length field being greater than a predetermined value). Although the OPTIONS_PRESENT field 405 and OPTION_SECTION portion 410 are illustrated as adjacent to each other and at the end of message 400, they may be arranged or otherwise encoded in message 400.

In the example illustrated in FIG. 4, OPTION_SECTION portion 410 of message 400 includes a NUM_OPTIONS value 420 indicating a number of TCP options encoded in OPTION_SECTION portion 410. Where NUM_OPTIONS value 420 indicates a number greater than one, OPTION_SECTION portion 410 may include that number of TCP option blocks; FIG. 4 illustrates an OPTION_SECTION portion 410 including 'n' TCP option blocks, labeled OPTION_BLOCK 425-1 to OPTION_BLOCK 425-n.

Each of the TCP option blocks, such as OPTION_BLOCK 425-1, may include a number of fields or portions.

As illustrated in FIG. 4, OPTION_BLOCK 425-1 includes an OPTION_KIND field 430 which encodes an option-kind value for its respective TCP option. For example, a Selective Acknowledgement (SACK) Permitted TCP option, having an option-kind value of 4 in a TCP header, may also be encoded with a value of 4 in OPTION_KIND field 430. Other encoding schemes may be used to indicate that a TCP option having a particular option-kind value was included in, or absent from, a TCP segment. OPTION_BLOCK 425-1 may also include an UNRECOGNIZED field 435 which encodes whether the respective TCP option is considered to be recognized TCP option to which option-specific processing is applied, or if it is an unrecognized "pass through" TCP option, for which the OPTION_KIND field 430, LENGTH field 445, and OPTION_DATA data portion 450 data are simply transferred directly between message 400 and corresponding TCP segments without option-specific processing by a proxy. In some implementations, the UNRECOGNIZED field 435 may be implicitly encoded in, and/or determined by a proxy node based on, OPTION_KIND field 430, and accordingly OPTION_BLOCK 425-1 may not include a separate UNRECOGNIZED field 435. OPTION_BLOCK 425-1 may also include a HANDLING field 440 which may encode whether the respective TCP option is suppressed, supported only on the local leg of the split TCP connection (for example, between local endpoint 310 and local proxy 312), supported only on the remote leg of the split TCP connection (for example, between remote proxy node 315 and remote endpoint 317), or supported on both the local and remote legs of the split TCP connection. Such option-specific handling is discussed below. In some implementations, the HANDLING field 440 may be implicitly encoded in, and/or determined by a proxy node based on, OPTION_KIND field 430, and accordingly OPTION_BLOCK 425-1 may not include a separate HANDLING field 440. OPTION_BLOCK 425-1 may also include a LENGTH field 445 indicating a length (for example, a byte or word count) for OPTION_DATA data portion 450. Together, LENGTH field 445 and OPTION_DATA data portion 450 allow an arbitrary amount of data to be included in message 400 for the respective TCP option. For example, a SACK TCP option included in a TCP segment that acknowledges receipt of two blocks may have a corresponding LENGTH field 445 value of 16 (representing 16 bytes), and an 16 byte long OPTION_DATA data portion 450 encoding left and right edge values (each 4 bytes) for the two blocks (for a total of 16 bytes). The arrangement of the fields or portions of OPTION_BLOCK 425-1 in FIG. 4 are merely illustrative, and may be otherwise arranged or encoded in OPTION_BLOCK 425-1, OPTION_SECTION portion 410, or message 400. Additional TCP option blocks in OPTION_SECTION portion 410, such as where NUM_OPTIONS value 420 indicates two or more TCP options are encoded in OPTION_SECTION portion 410, may be similarly encoded.

With reference to step 305 in FIG. 3A, step 321 in FIG. 3B, and step 361 in FIG. 3C, when a local endpoint (such as local endpoints 300 or 310) transmits a TCP SYN segment to initiate a new TCP connection with a remote endpoint (such as remote endpoints 304, 316, or 317), a local proxy node (such as one of proxy node(s) 302 or local proxy node 312) that receives the TCP SYN segment determines whether to perform TCP spoofing for the connection and, for a spoofed connection, selectively processes and communicates TCP options included in the TCP SYN segment. In some implementations, connection classification rules may be defined to identify a rule applicable to the new TCP connection based on information encoded in the TCP SYN segment, such as, but not limited to, a source address, a source port, a destination address, and a destination port. Based on the identified rule, the local proxy node may block the connection (in which case a TCP RST segment may be sent to the local endpoint). Based on the identified rule, the local proxy node may not spoof the connection (as illustrated in FIG. 3A). Based on the identified rule, the local proxy node may determine to enable (as illustrated in FIG. 3B) or disable (as illustrated in FIG. 3C) three-way handshake spoofing. Based on the identified rule, the local proxy node may identify a remote proxy node (such as remote proxy nodes 314 or 316) associated with the remote endpoint to which the TCP SYN segment is directed. In some implementations, the local proxy node may determine whether the identified remote proxy node supports extended TCP option handling for spoofed connections, such as via negotiating a backbone connection with the identified remote proxy node. The identified rule may indicate that extended TCP option handling is allowed or disallowed. Algorithm 1, below, illustrates an example algorithm utilizing such classification rules.

---

Algorithm 1: Handling of TCP SYN segment received by local proxy node from local endpoint for new TCP connection

---

```
# these two are used by the local proxy through lifetime of the TCP
# connection
negotiatedTCPOptsList = [ ]
cxnHandling = NOT_SET
# assumption: enhanced TCP option handling has already been
# negotiated successfully with remote peer
# NOTE: the remote peer may be selected based on the rule
# identified below
# values for connection handling (least restrictive to most)
# spoofed, with three-way handshake spoofing enabled
CXNHANDLING_SPOOF_3WHS_YES = 0
# spoofed, with three-way handshake spoofing disabled
CXNHANDLING_SPOOF_3WHS_NO = 1
# unspoofed (for example, simple IP packet forwarding)
CXNHANDLING_UNSPOOF = 2
# block connection
CXNHANDLING_BLOCK = 3
# find classification rule based on the SYN segment
# (for example, based on SrcIP, SrcPort, DestIP, DestPort)
rule = getClassificationRule(tcpSegment)
# determine connection handling based on identified rule
cxnHandling = rule.handling
# no TCP option handling if there is no spoofing being performed
if ((handling == CXNHANDLING_BLOCK) ||
    (handling == CXNHANDLING_UNSPOOF))
    return # enhanced TCP option handling only used if spoofed
# make sure enhanced TCP option handling is enabled in rule
# identified for the new connection
if (rule.tcpOptionsEnabled == FALSE)
    return # rule indicates no enhanced TCP option handling
# the TCP options in the SYN segment may change the connection
# handling. See if a TCP option further restricts the connection
# handling (most restrictive handling wins)
for each TCP option in SYN segment:
    newHandling = getTCPOptCxnHandling(thisOption)
    if (newHandling > handling)
        handling = newHandling
# no TCP option handling if there is no spoofing being performed
if ((handling == CXNHANDLING_BLOCK) ||
    (handling == CXNHANDLING_UNSPOOF))
    return # enhanced TCP option handling only used if spoofed
# values for option handling
# only support on leg between local endpoint and local proxy
OPTHANDLING_LOCAL_ONLY = 0
# only support on leg between remote endpoint and remote proxy
OPTHANDLING_REMOTE_ONLY = 1
# handle on both local and remote legs
OPTHANDLING_LOCAL_AND_REMOTE = 2
# suppressed - option is ignored
```

---

Algorithm 1: Handling of TCP SYN segment received by local proxy node from local endpoint for new TCP connection

---

```
OPTHANDLING_SUPPRESS = 3
# go through each of the TCP options in the SYN segment
# some may involve option-specific processing
# information for some may be encoded in CR message to remote proxy
for each TCP option in SYN segment:
    # below function determines handling of the TCP option
    # might refer to a TCP Options Handling Configuration table
    optHandling = getTCPOptOptionHandling(thisOption)
    if (optHandling == OPTHANDLING_SUPPRESS)
        continue # just skip the option entirely
    # below function determines if unrecognized/passthrough TCP option
    # might refer to TCP Options Handling Config table
    unrecognized = getTCPOptUnrecognized(thisOption)
    if (unrecognized == TRUE)
        # this is an unrecognized TCP option - simply do passthrough
        # 3WHS spoofing disabled if there is an unrecognized option
        cxnHandling = CXNHANDLING_SPOOF_3WHS_NO
        # do simple copy of TCP option into CR message
        addOptionToProxyMsg(thisOption, unrecogFlag=TRUE,
                            handling=DONTCARE)
        continue # no further processing for this TCP option
    # determine if TCP option is encoded in CR message without
    # option-specific processing by local proxy
    if (optHandling == OPTHANDLING_REMOTE_ONLY)
        # add option block to CR message
        # last param indicates if remote only or local+remote
        addOptionToProxyMsg(thisOption, unrecogFlag=FALSE,
                            handling=optHandling)
    # determine if option-specific processing performed by local proxy
    else if ((optHandling == OPTHANDLING_LOCAL_ONLY) ||
             (optHandling == OPTHANDLING_LOCAL_AND_REMOTE))
        # do local processing of option
        if (cxnHandling == CXNHANDLING_SPOOF_3WHS_YES)
            # below function processes the TCP option at local proxy
            # and returns TRUE if it adds a TCP option response into
            # a spoofed SYN-ACK segment. It may also add an option
            # block to the CR message
            if (peerLocalProcessTCPOpt(thisOption) == TRUE)
                # considered a "negotiated" TCP option
                negotiatedTCPOptsList.append(thisOption.kind)
        else
            # below function does a first processing of the TCP option
            # at the local proxy (a second processing may be done after
            # receiving CE message). This could add option block to CR
            # message, if OPTHANDLING_LOCAL_AND_REMOTE
            # (if so, unRecogFlag=FALSE and handling=optHandling)
            peerLocalPreProcessTCPOpt(thisOption)
```

---

As illustrated in Algorithm 1, above, in addition to determining a connection handling based on such rules, that connection handling may be changed (at least where that connection handling will be spoofed) based on which TCP options are included in the TCP SYN segment. For example, a TCP options handling configuration table, such as the one illustrated in Table 1, below, may indicate, based on an option-kind value for a TCP option, whether a more restrictive connection handling should be applied than the rule-based determination, or the local proxy node may otherwise be configured to make such a determination. In Algorithm 1, the getTCPOptCxnHandling function is used to identify connection handling for each TCP option. For example, although the rule for the TCP SYN segment may indicate a spoofed connection with three-way handshake spoofing enabled (CXNHANDLING_SPOOF_3WHS_YES), inclusion of a Quick-Start Response TCP option (option-kind 27) may result in the connection being blocked (CXNHANDLING_BLOCK). The most restrictive connection handling—whether according to the rule or any of the TCP options in the TCP SYN segment—is used as the connection handling.

TABLE 1

Example TCP Options Handling Configuration Table

| Description | option-kind | Connection Handling | TCP Option Handling | Unrecognized |
|---|---|---|---|---|
| MSS | 2 | SPOOF_3WHS_YES | LOCAL_AND_REMOTE | NO |
| Window Scaling | 3 | SPOOF_3WHS_NO | LOCAL_ONLY | NO |
| SACK Permitted, SACK | 4, 5 | SPOOF_3WHS_YES | LOCAL_ONLY | NO |
| Timestamps | 8 | SPOOF_3WHS_NO | LOCAL_AND_REMOTE | YES |
| Authentication Option | 29 | UNSPOOF | LOCAL_ONLY | NO |
| Quick-Start Response | 27 | BLOCK | DO_NOT_CARE | NO |
| Reserved | 35-75 | SPOOF_3WHS_YES | SUPPRESS | NO |

Where the resulting connection handling is spoofed, whether CXNHANDLING_SPOOF_3WHS_YES (FIG. 3B) or CXNHANDLING_SPOOF_3WHS_NO (FIG. 3C), and extended TCP option handling may be used, the local proxy may selectively determine, individually for each TCP option included in the TCP SYN segment, how each TCP option will be handled (including, for example, whether the local proxy node should perform option-specific processing, and whether information about the TCP option is encoded in a Connection Request (CR) message corresponding to the TCP SYN segment, such as in an OPTION_SECTION portion 410 as illustrated in FIG. 4). In some implementations, as illustrated in Table 1, above, a TCP options handling configuration table may indicate, based on an option-kind value, whether the TCP option is an "unrecognized" or "passthrough" option, or the local proxy node may be otherwise configured to make such a determination. For such TCP options, rather than performing option-specific processing at the local proxy node and/or the remote proxy node, data for the TCP option (any present option-kind, option-length, and/or option-data fields or portions) are simply copied or transferred without modification (ignoring encoding or encryption applied to the data) between TCP headers and proxying messages. For example, an option-data portion from the TCP SYN segment at step 361 may be included unchanged in a portion of the CR message (such as the OPTION_DATA data portion 450 illustrated in FIG. 4) at step 363, and that portion of the CR message may be included unchanged in an option-data portion of the TCP SYN message at step 365.

In some implementations, as illustrated in Table 1, above, a TCP options handling configuration table may indicate, based on an option-kind value, how each TCP option should be handled: suppressed (OPTHANDLING_SUPPRESS), supported only on the leg between the local endpoint and the local proxy node (OPTHANDLING_LOCAL_ONLY), supported only on the leg between the remote endpoint and the remote proxy node (OPTHANDLING_REMOTE_ONLY), or supported on both the local and remote legs (OPTHANDLING_LOCAL_AND_REMOTE); or the local proxy node may be otherwise configured to make such a determination (such as, for example, use of "hard coded" values in program code, rather than referencing a TCP options handling configuration table). In Algorithm 1, the getTCPOptOptionHandling function is used to identify such handling for each option. Where handling on the local leg is indicated for a TCP option, the local proxy node may perform option-specific processing for the TCP option. Where handling on the remote leg is indicated for a TCP option, the local proxy node may encode data for the TCP option in the CR message, or otherwise indicate that the TCP option was included in the TCP SYN segment received from the local endpoint. As illustrated in Algorithm 1, above, and Algorithm 4, below, option-specific processing for a TCP option by the local proxy node may include a first processing done before sending the CR message (see the peerLocalPreProcessTCPOpt function in Algorithm 1) and/or a second processing done after receiving a respective Connection Established (CE) message (see the peerLocalPostProcessTCPOpt function in Algorithm 4). For example, data for a TCP option, whether from the remote endpoint or the remote proxy node, may affect option-specific processing performed by the local proxy node. The first processing may affect whether data is encoded in the CR message for a TCP option, and what data is encoded. In many circumstances, such an encoding may be similar to a passthrough encoding for a TCP option. Where three-way handshake spoofing is enabled for the connection, a single option-specific processing may be performed by the local proxy node (see, for example, the peerLocalProcessTCPOpt function in Algorithm 1).

As a result of such handling of TCP options included in the TCP SYN segment received from the local endpoint, the CR message sent to the remote proxy node at step 323 or step 363 may include TCP option data (for example, as discussed in connection with FIG. 4). Algorithm 2, below, illustrates an example of how the remote proxy node may handle the CR message, including creating and sending an associated TCP SYN segment from the remote proxy node to the remote endpoint. As illustrated in Algorithms 2 and 3, below, option-specific processing for a TCP option by the remote proxy node may include a first processing done before sending the TCP SYN segment (see the peerRemotePreProcessTCPOpt function in Algorithm 2) and/or a second processing done after receiving a respective SYN-ACK segment (see the peerRemotePostProcessTCPOpt function in Algorithm 3). Also, passthrough of TCP options from the CR message to the TCP SYN segment may be performed for particular TCP options encoded in the CR message. The determination in Algorithm 2 of whether a TCP option is unrecognized/passthrough may be based on, for example, an express passthrough indicator in the CR message (such as the UNRECOGNIZED field 435 illustrated in FIG. 4) or based on an option-kind value in the CR message (such as the OPTION_KIND field 430 illustrated in FIG. 4, and possibly with reference to a TCP options handling configuration table such as the example illustrated in Table 1).

Algorithm 2: Handling of Connection Request
(CR) message received by remote proxy
node from local proxy node for new TCP connection

```
# these two are used by the remote proxy through lifetime of the TCP
# connection
rvdTCPOptsList = [ ]
negotiatedTCPOptsList = [ ]
# assumption: enhanced TCP option handling has already been
# negotiated successfully with local peer
# go through all of the TCP options in the CR message
for each TCP option in CR message:
    # keep track of received TCP options for handling SYN-ACK
    # in some implementations, might only append to rvdTCPOptsList if
    # actually sent in SYN segment
    rvdTCPOptsList.append(thisOption)
    # determine if unrecognized/passthrough TCP option
    if (thisOption.unrecognized == TRUE)
        # do simple copy of TCP option into SYN segment header
        addPassthroughOptionToTCPHdr(thisOption)
            continue # no further processing for this TCP option
    # below function does a first processing of the TCP option at the
    # remote proxy (a second processing may be done after receiving
    # SYN-ACK segment from remote endpoint). This will also add the TCP
    # option to the TCP header of the SYN segment (in some situations,
    # the first processing may not include the TCP option in the SYN)
    peerRemotePreProcessTCPOpt(thisOption)
```

Algorithm 3, below, illustrates an example of how the remote proxy node may handle the TCP SYN-ACK segments at step 337 or step 367, including creating and sending an associated Connection Established (CE) message from the remote proxy node to the local proxy node. As a result of such handling of TCP options included in the TCP SYN-ACK segment received from the remote endpoint, the CE message sent to the local proxy node at step 339 or step 369 may include TCP option data (for example, as discussed in connection with FIG. 4). The determination in Algorithm 3 of whether a TCP option is unrecognized/passthrough may be based on, for example, the determination made for the TCP option for the TCP connection in Algorithm 2, or based on an option-kind value in the TCP SYN-ACK segment (and possibly with reference to a TCP options handling configuration table such as the example illustrated in Table 1).

Algorithm 3: Handling of TCP SYN-ACK segment received by
remote proxy node from remote endpoint in response
to TCP SYN segment sent by remote proxy node

```
# go through all of the TCP options in the SYN-ACK segment
for each TCP option in SYN-ACK segment:
    # OPTIONAL: filter out TCP options not in rvdTCPOptsList
    synOption = rvdTCPOptsList.find(thisOption)
    if (synOption == FALSE)
        continue # ignore TCP option (not sent in SYN)
    # OPTIONAL: track this as a "negotiated" TCP option
    negotiatedTCPOptsList.append(thisOption.kind)
    # determine if unrecognized/passthrough
    if (synOption.unrecognized == TRUE)
        # do simple copy of TCP option into CE message
        addOptionToProxyMsg(thisOption, unrecogFlag=TRUE)
        continue # no further processing for this TCP option
    # below function does a second processing of the TCP option at the
    # remote proxy (which may be based on data in SYN-ACK
    segment, data
    # in CR message, and/or data generated by the first processing).
    # This will also encode data for the TCP option in the CE message
    # (if OPTHANDLING_LOCAL_AND_REMOTE)
    peerRemotePostProcessTCPOpt(thisOption, synOption)
    # OPTIONAL: processing for TCP options in rvdTCPOptsList that were
    # not in SYN-ACK segment
```

Algorithm 4, below, illustrates an example of how the local proxy node may handle the CE message at step 369 (and a portion of this approach may be used to handle the CE message at step 339), including creating and sending an associated TCP SYN-ACK segment from the local proxy node to the local endpoint (see step 371 in FIG. 3C). The determination in Algorithm 4 of whether a TCP option is unrecognized/passthrough may be based on, for example, an determination made for the TCP option for the TCP connection in Algorithm 1 (as illustrated in Algorithm 4), based on an express passthrough indicator in the CE message (such as the UNRECOGNIZED field 435 illustrated in FIG. 4), or based on an option-kind value in the CE message (such as the OPTION_KIND field 430 illustrated in FIG. 4, and possibly with reference to a TCP options handling configuration table such as the example illustrated in Table 1).

Algorithm 4: Handling of Connection Established
(CE) message received by local proxy
node in response to CR message sent by local proxy node

```
# go through all of the TCP options in the CE message
for each TCP option in CE message:
    # determine if unrecognized/passthrough TCP option
    if (thisOption.unrecognized == TRUE)
        # do simple copy of TCP option into SYN-ACK segment header
        addPassThroughOptionToTCPHdr(thisOption)
        continue # no further processing for this TCP option
    # below function does a second processing of the TCP option at the
    # local proxy (which may be based on data in CE message, data in
    # SYN segment from local endpoint, and/or data generated by the
    # first processing. The function returns TRUE if it adds the TCP
    # option to the SYN-ACK segment
    if (peerLocalPostProcessTCPOpt(thisOption) == TRUE)
        # considered a "negotiated" TCP option
        negotiatedTCPOptsList.append(thisOption.kind)
# there may be TCP options with OPTHANDLING_LOCAL_ONLY
handling
# that also should be included in the SYN-ACK to the local endpoint
```

Algorithms 1-4, above, address enhanced TCP option handling in connection with establishing a spoofed TCP connection. Algorithms 5-8, below, illustrate similar enhanced TCP option handling that may be performed over the duration or lifetime of the established TCP connection, during which data may be exchanged between the local endpoint or the remote endpoint. Algorithm 5, below, illustrates an example of how the local proxy node may handle the TCP data segments received from the local endpoint at step 329 (FIG. 3B) or step 383 (FIG. 3C), including creating and sending an associated TCP Data (TD) message from the local proxy node to the remote proxy node (see steps 333 and 389). As a result of such handling of TCP options included in the TCP data segment received from the local endpoint, the TD message sent to the remote proxy node at step 333 or step 389 may include TCP option data (for example, as discussed in connection with FIG. 4). The determination in Algorithm 5 of whether a TCP option is unrecognized/passthrough may be based on, for example, the determination made for the TCP option for the TCP connection in Algorithm 1 or 4, or based on an option-kind value in the TCP data segment (and possibly with reference to a TCP options handling configuration table such as the example illustrated in Table 1).

Algorithm 5: Handling of TCP data segment received by
local proxy node from local endpoint

```
# some option-kind values
TCPOPTKIND_SACK_PERMITTED = 4
TCPOPTKIND_SACK = 5
```

-continued

Algorithm 5: Handling of TCP data segment received by
local proxy node from local endpoint

```
# go through all of the TCP options in the data segment
for each TCP option in data segment:
    # OPTIONAL: only accept "negotiated" TCP options
    # special case: SACK Permitted enables later SACKs
    kind = thisOption.kind
    if (kind == TCPOPTKIND_SACK)
        kind = TCPOPTKIND_SACK_PERMITTED
    if (negotiatedTCPOptsList.find(kind) == FALSE)
        continue # suppress the TCP option
    # determine if unrecognized/passthrough TCP option
    unrecognized = getTCPOptUnrecognized(thisOption)
    if (unrecognized == TRUE)
        # do simple copy of TCP option into TD message
        addOptionToProxyMsg(thisOption, unrecogFlag=TRUE)
        continue # no further processing for this TCP option
    optHandling = getTCPOptOptionHandling(thisOption)
    # below function does option-specific processing of the TCP option
    # at the local proxy. This will also add the option to the TD
    # message (if it does, unRecogFlag=FALSE)
    peerLocalProcessDataTCPOpt(thisOption, optHandling)
```

Algorithm 6, below, illustrates an example of how the remote proxy node may handle the TD messages received from the local endpoint at step 333 (FIG. 3B) or step 389 (FIG. 3C), including creating and sending an associated TCP data segment from the remote proxy node to the remote endpoint (see steps 333 and 393). The determination in Algorithm 6 of whether a TCP option is unrecognized/passthrough may be based on, for example, the determination made for the TCP option for the TCP connection in Algorithm 2 or 3 (as illustrated in Algorithm 6), based on an express passthrough indicator in the TD message (such as the UNRECOGNIZED field 435 illustrated in FIG. 4), or based on an option-kind value in the TD message (such as the OPTION_KIND field 430 illustrated in FIG. 4, and possibly with reference to a TCP options handling configuration table such as the example illustrated in Table 1).

Algorithm 6: Handling of TCP Data (TD) message received by
remote proxy node from local proxy node

```
# go through all of the TCP options in the TD message
for each TCP option in TD message:
    # determine if unrecognized/passthrough TCP option
    synOption = rvdTCPOptsList.find(thisOption)
    if (synOption.unrecognized == TRUE)
        # do simple copy of TCP option into TCP data segment
        addPassThroughOptionToTCPHdr(thisOption)
        continue # no further processing for this TCP option
    # below function does option-specific processing of the TCP option
    # at the remote proxy. This will also add the option to the TCP
    # data segment sent to the remote endpoint (if
    # OPTHANDLING_LOCAL_AND_REMOTE)
    peerRemoteProcessDataProxyMsgOpt(thisOption, optHandling)
```

Algorithm 7, below, illustrates an example of how the remote proxy node may handle the TCP data segments received from the remote endpoint at step 345 (FIG. 3B) or step 375 (FIG. 3C), including creating and sending an associated TCP Data (TD) message from the remote proxy node to the local proxy node (see steps 349 and 377). As a result of such handling of TCP options included in the TCP data segment received from the remote endpoint, the TD message sent to the local proxy node at step 349 or step 377 may include TCP option data (for example, as discussed in connection with FIG. 4). The determination in Algorithm 7 of whether a TCP option is unrecognized/passthrough may be based on, for example, the determination made for the TCP option for the TCP connection in Algorithm 2, 3, or 6, or based on an option-kind value in the TCP data segment (and possibly with reference to a TCP options handling configuration table such as the example illustrated in Table 1).

Algorithm 7: Handling of TCP data segment received by
remote proxy node from remote endpoint

```
# go through all of the TCP options in the data segment
for each TCP option in data segment:
    # OPTIONAL: only accept "negotiated" TCP options
    # special case: SACK Permitted enables later SACKs
    kind = thisOption.kind
    if (kind == TCPOPTKIND_SACK)
        kind = TCPOPTKIND_SACK_PERMITTED
    if (negotiatedTCPOptsList.find(kind) == FALSE)
        continue # suppress the TCP option
    # determine if unrecognized/passthrough TCP option
    synOption = rvdTCPOptsList.find(thisOption)
    if (synOption.unrecognized == TRUE)
        # do simple copy of TCP option into TD message
        addOptionToProxyMsg(thisOption, unrecogFlag=TRUE)
        continue # no further processing for this TCP option
    # below function does option-specific processing of the TCP option
    # at the remote proxy. This will also add the option to the TD
    # message (if it does, unRecogFlag=FALSE)
    peerRemoteProcessDataTCPOpt(thisOption, synOption)
```

Algorithm 8, below, illustrates an example of how the local proxy node may handle the TD messages received from the remote endpoint at step 349 (FIG. 3B) or step 377 (FIG. 3C), including creating and sending an associated TCP data segment from the local proxy node to the local endpoint (see steps 351 and 385). The determination in Algorithm 8 of whether a TCP option is unrecognized/passthrough may be based on, for example, the determination made for the TCP option for the TCP connection in Algorithm 1, 4, or 5, based on an express passthrough indicator in the TD message (such as the UNRECOGNIZED field 435 illustrated in FIG. 4), or based on an option-kind value in the TD message (such as the OPTION_KIND field 430 illustrated in FIG. 4, and possibly with reference to a TCP options handling configuration table such as the example illustrated in Table 1).

Algorithm 8: Handling of TCP Data (TD) message received
by local proxy node from remote proxy node

```
# go through all of the TCP options in the TD message
for each TCP option in TD message:
    # determine if unrecognized/passthrough TCP option
    # below uses indication from TD message
    # alternative: use approach in Algorithm 1
    if (thisOption.unrecognized == TRUE)
        # do simple copy of TCP option into TCP data segment
        addPassThroughOptionToTCPHdr(thisOption)
        continue # no further processing for this TCP option
    # below function does option-specific processing of the TCP option
    # at the local proxy. This will also add the option to the TCP
    # data segment sent to the local endpoint
    peerLocalProcessDataProxyMsgOpt(thisOption)
```

Additionally, the proxy nodes may be configured to collect and make available statistics relating to encountered TCP options and how they were handled by the proxy nodes. The proxy nodes may be configured to collect and make available statistics relating to the connection handling applied in connection with observed TCP options. For blocked connections (CXNHANDLING_BLOCK), for each TCP option observed by a proxy node, there may be a counter that is increased each time that TCP option is included in a TCP SYN segment that is blocked (in some implementations, the counter may be for unique connections); and/or a total number of blocked connections may be maintained. For unspoofed connections (CXNHANDLING_UNSPOOF), for each TCP option observed by a proxy node, there may be a counter that is increased each time that TCP option is included in a TCP SYN segment that is unspoofed (in some implementations, the counter may be for unique connections); and/or a total number of unspoofed connections may be maintained. Connections that are unspoofed because of a TCP option may be recorded separately. For spoofed connections without three-way handshake spoofing (CXNHANDLING_SPOOF_3WHS_NO), for each TCP option observed by a proxy node, there may be a counter that is increased each time that TCP option is included in a TCP SYN segment for which 3WHS is not performed (in some implementations, the counter may be for unique connections); and/or a total number of connections for which 3WHS is not performed may be maintained. For spoofed connections using three-way handshake spoofing (CXNHANDLING_SPOOF_3WHS_YES), for each TCP option observed by a proxy node, there may be a counter that is increased each time that TCP option is included in a TCP SYN segment for which 3WHS is performed (in some implementations, the counter may be for unique connections); and/or a total number of connections for which 3WHS is performed may be maintained.

The proxy nodes may be configured to collect and make available statistics relating to the TCP option handling applied in connection with observed TCP options. For suppressed TCP options (OPTHANDLING_SUPPRESS), for each TCP option observed by a proxy node, there may be a counter that is increased each time that TCP option is suppressed (in some implementations, the counter may be for unique connections); and/or a total number of connections in which one or more TCP options were suppressed may be maintained. For TCP options supported only on the local leg (OPTHANDLING_LOCAL_ONLY), for each TCP option observed by a proxy node, there may be a counter that is increased each time that TCP option is only supported on the local leg (in some implementations, the counter may be for unique connections); and/or a total number of connections in which one or more TCP options were only supported on the local leg may be maintained. For TCP options supported only on the remote leg (OPTHANDLING_REMOTE_ONLY), for each TCP option observed by a proxy node, there may be a counter that is increased each time that TCP option is only supported on the remote leg (in some implementations, the counter may be for unique connections); and/or a total number of connections in which one or more TCP options were only supported on the remote leg may be maintained. For TCP options supported on both the local and remote legs (OPTHANDLING_LOCAL_AND_REMOTE), for each TCP option observed by a proxy node, there may be a counter that is increased each time that TCP option is supported on both the local and remote legs (in some implementations, the counter may be for unique connections); and/or a total number of connections in which one or more TCP options were supported on both the local and remote legs may be maintained.

Depending on the presence or absence of one or more TCP options (included in a TCP SYN segment and/or TCP data segments), the proxy nodes may perform explicit actions, such as, but not limited to: collecting TCP option details (such as which TCP options were requested by an endpoint when initiating a TCP connection), connection details (such as source IP address and port, destination IP address and port), and/or user specific details (such as subscriber name and/or service plan). In some implementations, the collected information may be used for pattern recognition to identify device details (such as, but not limited to, device manufacturer, model, and/or make) for an endpoint without employing an external deep packet inspector. For example, devices for a particular manufacturer, model, or make may request use of particular combinations of TCP options and/or specify particular values in connection with particular TCP options. The identified device details may be used to control handling of a network connection for the endpoint (for example, a TCP connection being initiated by a TCP SYN segment received from the endpoint, an existing TCP connection for the endpoint, and/or later TCP connections for the endpoint) by the proxy nodes and/or a communication network including the proxy nodes. Based on such identified device details, a connection handling (block, unspoofed, spoofing without three-way handshake spoofing, or spoofing with three-way handshake spoofing, as discussed above) for a new TCP connection may be determined. For example, based on such identified device details indicating a make or model that poses security-related or other negative issues, a new TCP connection may be blocked or an existing TCP connection may be terminated.

Figure 5:
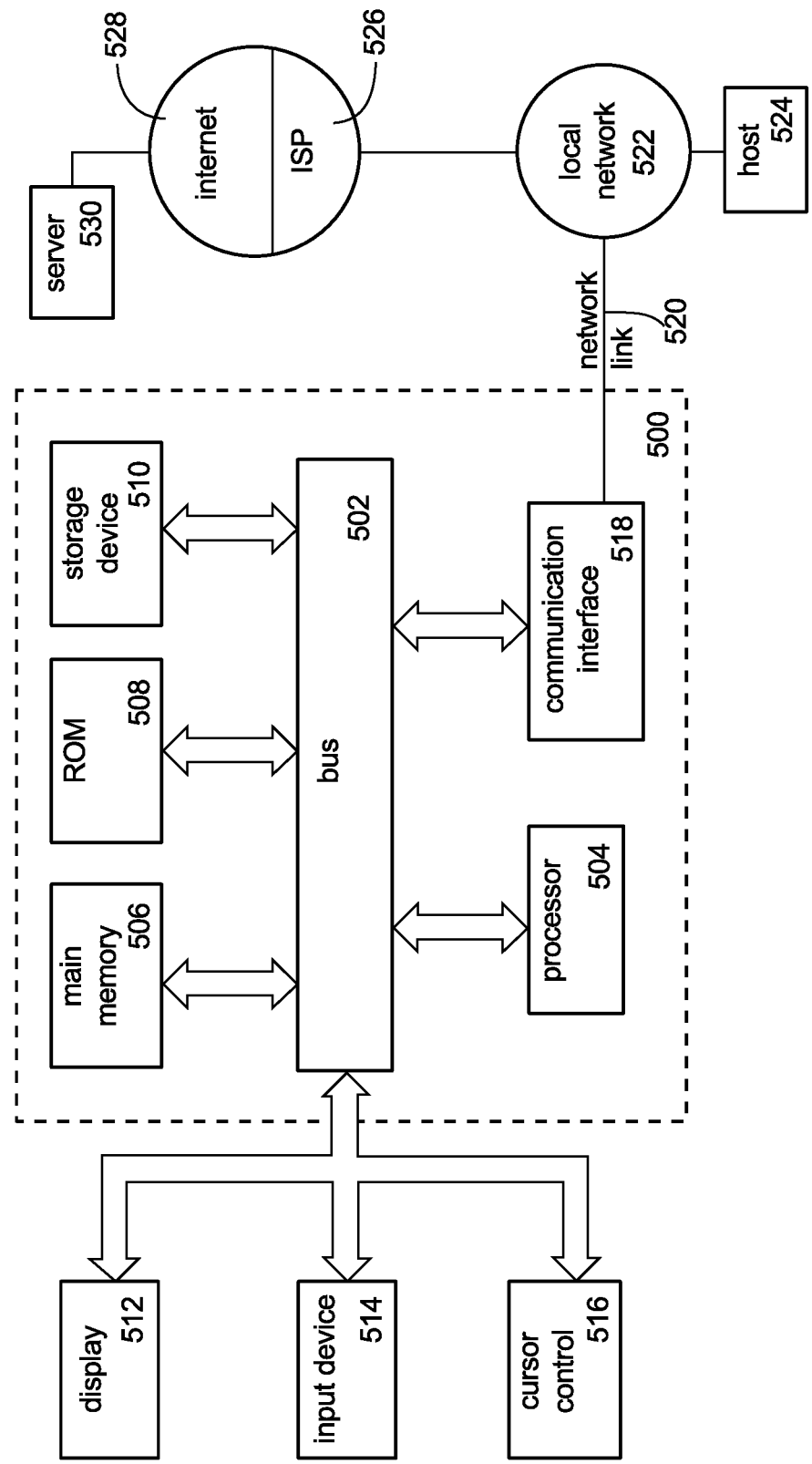
FIG. 5 is a block diagram that illustrates a computer system 500 upon which aspects of this disclosure may be implemented.

FIG. 5 is a block diagram that illustrates a computer system 500 upon which aspects of this disclosure may be implemented, such as, but not limited to, local proxy nodes 120 and 312; remote proxy nodes 140, 314, and 315; proxy node(s) 302; local endpoints 110, 300, and 310; remote endpoints 150, 304, 316, and 317; satellite 232; satellite terminals 234*a* to 234*n*; gateways 238*a* to 238*n*; network operations center 242; and IP gateways 248*a*(1) to 248*n*(n). Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Another type of user input device is a touchscreen, which generally combines display 512 with hardware that registers touches upon display 512.

This disclosure is related to the use of computer systems such as computer system 500 for implementing the techniques described herein. In some examples, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
receiving, at a first proxy node, a first TCP (Transmission Control Protocol) SYN segment from a first endpoint to establish a TCP connection with a second endpoint, the first TCP SYN segment including a first TCP option having a first option-kind value;
transmitting a first spooled connection request message corresponding to the first TCP SYN segment from the first proxy node to a second proxy node associated with the second endpoint;
including, in response to the first TCP option having the first option-kind value, an indication in the first spoofed connection request message that a TCP option having the first option-kind value was included in the first TCP SYN segment;
receiving, at the first proxy node, a second TCP SYN segment from a third endpoint to establish a TCP connection with a fourth endpoint, the second TCP SYN segment including a second TCP option having a second option-kind value different from the first option-kind value;
transmitting a second spoofed connection request message corresponding to the second TCP SYN segment from the first proxy node to a third proxy node associated with the fourth endpoint; and
not including, in response to the second TCP option having the second option-kind value, an indication in the second spoofed connection request message that a TCP option having the second option-kind value was included in the second TCP SYN segment.

2. The method of claim 1, wherein:
the first TCP SYN segment includes a third TCP option having a third option-kind value different from the first option-kind value: and
the method further includes not including, in response to the third TCP option having the third option-kind value, an indication in the first spoofed connection request message that a TCP option having the third option-kind value was included in the first TCP SYN segment.

3. The method of claim 1, further comprising:
receiving, at the first proxy node, a first spoofed connection established message corresponding to the first spoofed connection request message from the second proxy node;
waiting, in response to the first TCP option having the option-kind value, for the receiving of the first spoofed connection established message before transmitting a first TCP SYN-ACK segment corresponding to the first TCP SYN segment from the first proxy node to the first endpoint;
receiving, at the first proxy node, a third TCP SYN segment from a fifth endpoint to establish a TCP connection with a sixth endpoint, the third TCP SYN segment including a third TCP option having a third option-kind value different from the first option-kind value;
transmitting a third spoofed connection request message corresponding to the third TCP SYN segment from the first proxy node to a fourth proxy node associated with the sixth endpoint;
receiving, at the first proxy node, a second spoofed connection established message corresponding to the third spoofed connection request message from the second proxy node; and
transmitting, in response to the third TCP option having the third option-kind value, a second TCP SYN-ACK segment corresponding to the second TCP SYN segment from the first proxy node to the fifth endpoint before the receiving of the second spoofed connection established message.

4. The method of claim 1, further comprising:
receiving, at the first proxy node, a third TCP SYN segment from a fifth endpoint to establish a TCP connection with a sixth endpoint, the third TCP SYN segment including a third TCP option having a third option-kind value different from the first and second option- kind values;
blocking, at the first proxy node and in response to the third TCP option having the third option-kind value, establishing a TCP connection with the sixth endpoint in response to the received third TCP SYN segment;
receiving, at the first proxy node, a fourth TCP SYN segment from a seventh endpoint to establish a TCP connection with an eighth endpoint, the fourth TCP SYN segment including a fourth TCP option having a fourth option-kind value different from the first, second, and third option-kind values; and
transmitting, in response to the fourth TCP option having the fourth option-kind value, an unspoofed connection request message corresponding to the fourth TCP SYN segment from the first proxy node to a fourth proxy node associated with the eighth endpoint.

5. The method of claim 1, further comprising:
transmitting a TCP SYN-ACK segment corresponding to the second TCP SYN segment from the first proxy node to the third endpoint; and
including, in response to the second TCP option having the second option-kind value, in the TCP SYN-ACK segment a TCP option having the second option-kind value.

6. The method of claim 1, further comprising:
including, in response to the first TCP option having the first option-kind value, an option-data portion of the first TCP option in the first spoofed connection request message;
receiving, at the first proxy node, a spoofed connection established message corresponding to the first spoofed connection request message from the second proxy node, the spoofed connection established message including a first option-data portion associated with the first option-kind value;
transmitting a first TCP SYN-ACK segment corresponding to the first TCP SYN segment from the first proxy node to the first endpoint; and
including, in response to the first TCP option having the fust option-kind value, in the first TCP SYN-ACK segment a TCP option having the first option-kind value and including the first option-data portion of the spoofed connection established message.

7. The method of claim 6, further comprising:
receiving, at the second proxy node, the first spoofed connection request message from the first proxy node;
transmitting, in response to the receiving of the first spoofed connection request message, a third TCP SYN segment from the second proxy node to the second endpoint;
including, in response to the first spoofed connection request message including the indication that a TCP option having the first option-kind value was included in the first TCP SYN segment, in the third TCP SYN segment a TCP option having the first option-kind value and including the option-data portion of the first TCP option included in the first spoofed connection request message;
receiving, at the second proxy node, a second TCP SYN-ACK segment corresponding to the third TCP SYN segment from the second endpoint, the second TCP SYN-ACK segment including a third TCP option having the first option-kind value and including an option- data portion; and
transmitting, in response to the receiving of die second TCP SYN-ACK segment, the spoofed connection established message from the second proxy node to the first proxy node, first option-data portion of the spoofed connection established message including the opiion-data portion of the third TCP option.

8. The method of claim 1, further comprising;
receiving, at the first proxy node, a third TCP SYN segment from a fifth endpoint to establish a TCP connection with a sixth endpoint, the third TCP SYN segment including a first plurality of TCP options;
identifying a device make or model for the fifth endpoint based on the first plurality of TCP options included in the third TCP SYN segment; and
controlling handling of a network connection for the fifth endpoint in response to the identified device make or model.

9. A non-volatile machine-readable storage medium including instructions stored thereon that, responsive to execution by one or more processors, cause the one or more processors to perform the method of claim 1.

10. A system comprising: one or more processors; and one or more machine-readable storage media including instructions stored thereon that, responsive to execution by the one or more processors, cause the system to perform operations including:

receiving, at a first proxy node, a first TCP (Transmission Control Protocol) SYN segment from a first endpoint to establish a TCP connection with a second endpoint, the first TCP SYN segment including a first TCP option having a first option-kind value;
transmitting a first spoofed connection request message corresponding to the first TCP SYN segment from the first proxy node to a second proxy node associated with the second endpoint;
including, in response to the first TCP option having the first option-kind value, an indication in the first spoofed connection request message that a TCP option having the first option-kind value was included in the first TCP SYN segment;
receiving, at the first proxy node, a second TCP SYN segment from a third endpoint to establish a TCP connection with a fourth endpoint, the second TCP SYN segment including a second TCP option having a second option-kind value different from the first option-kind value;
transmitting a second spoofed connection request message corresponding to the second TCP SYN segment from the first proxy node to a thiixi proxy node associated with the fourth endpoint; and
not including, in response to the second TCP option having the second option-kind value, an indication in the second spoofed connection request message that a TCP option having the second option-kind value was included in the second TCP SYN segment.

11. The system of claim 10, wherein:
the first TCP SYN segment includes a third TCP option having a third option-kind value different from the first option-kind value; and
the method further includes not including, in response to the third TCP option having the third option-kind value, an indication in the first spoofed connection request message that a TCP option having the third option-kind value was included in the first TCP SYN segment.

12. The system of claim 10, wherein the instructions further cause the system to perform operations including:
receiving, at the first proxy node, a first spoofed connection established message corresponding to the first spoofed connection request message from the second proxy node;
waiting, in response to the first TCP option having the option-kind value, for the receiving of the first spoofed connection established message before transmitting a first TCP SYN-ACK segment corresponding to the first TCP SYN segment from the first proxy node to the first endpoint;
receiving, at the first proxy node, a third TCP SYN segment from a fifth endpoint to establish a TCP connection with a sixth endpoint, the third TCP SYN segment including a third TCP option having a third option-kind value different from the first option-kind value;
transmitting a third spoofed connection request message corresponding to the third TCP SYN segment from the first proxy node to a fourth proxy node associated with the sixth endpoint;
receiving, at the first proxy node, a second spoofed connection established message corresponding to the third spoofed connection request message from the second proxy node; and
transmitting, in response to the third TCP option having the third option-kind value, a second TCP SYN-ACK segment corresponding to the second TCP SYN segment from the first proxy node to the fifth endpoint before the receiving of the second spoofed connection established message.

13. The system of claim 10, wherein the instructions further cause the system to perform operations including:
    receiving, at the first proxy node, a thiixi TCP SYN segment from a fifth endpoint to establish a TCP connection with a sixth endpoint, the third TCP SYN segment including a third TCP option having a third option-kind value different from the first and second option- kind values;
    blocking, at the first proxy node and in response to the third TCP option having the third option-kind value, establishing a TCP connection with the sixth endpoint in response to the received third TCP SYN segment;
    receiving, at the first proxy node, a fourth TCP SYN segment from a seventh endpoint to establish a TCP connection with an eighth endpoint, the fourth TCP SYN segment including a fourth TCP option having a fourth option-kind value different from the first, second, and third option-kind values; and
    transmitting, in response to the fourth TCP option having the fourth option-kind value, an unspoofed connection request message corresponding to the fourth TCP SYN segment from the first proxy node to a fourth proxy node associated with the eighth endpoint.

14. The system of claim 10, wherein the instructions further cause the system to perform operations including:
    transmitting a TCP SYN-ACK segment corresponding to the second TCP SYN segment from the first proxy node to the third endpoint; and
    including, in response to the second TCP option having the second option-kind value, in the TCP SYN-ACK segment a TCP option having the second option-kind value.

15. The system of claim 10, wherein the instructions further cause the system to perform operations including:
    including, in response to the first TCP option having the first option-kind value, an option-data portion of the first TCP option in the first spoofed connection request message;
    receiving, at the first proxy node, a spoofed connection established message corresponding to the first spoofed connection request message from the second proxy node, the spoofed connection established message including a first option-data portion associated with the first option-kind value;
    transmitting a first TCP SYN-ACK segment corresponding to the first TCP SYN segment from the first proxy node to the first endpoint; and
    including, in response to the first TCP option having the first option kind value, in the first TCP SYN-ACK segment a TCP option having the first option-kind value and including the first option-data portion of the spoofed connection established message.

16. The system of claim 15, wherein the instructions further cause the system to perform operations including:
    receiving, at the second proxy node, the first spoofed connection request message from the first proxy node;
    transmitting, in response to the receiving of the first spoofed connection request message, a third TCP SYN segment from the second proxy node to the second endpoint;
    including, in response to the first spoofed connection request message including the indication that a TCP option having the first option kind value was included in the first TCP SYN segment, in the third TCP SYN segment a TCP option having the first option-kind value and including the option-data portion of the first TCP option included in the first spoofed connection request message;
    receiving, at the second proxy node, a second TCP SYN-ACK segment corresponding to the thiixi TCP SYN segment from the second endpoint, the second TCP SYN-ACK segment including a third TCP option having the first option-kind value and including an option- data portion; and
    transmitting, in response to the receiving of the second TCP SYN-ACK segment, the spoofed connection established message from the second proxy node to the first proxy node, first option-data portion of the spoofed connection established message including the option-data portion of the third TCP option.

17. The system of claim 10, wherein the instructions further cause the system to perform operations including:
    receiving, at the first proxy node, a third TCP SYN segment from a fifth endpoint to establish a TCP connection with a sixtlt endpoint, the third TCP SYN segment including a first plurality of TCP options;
    identifying a device make or model for the fifth endpoint based on the first plurality of TCP options included in the third TCP SYN segment; and
    controlling handling of a network connection for the fifth endpoint in response to the identified device make or model.

* * * * *

UNITED STATES PATENT AND TRADEMARK OFFICE
CERTIFICATE OF CORRECTION

PATENT NO. : 10,205,804 B2
APPLICATION NO. : 15/422339
DATED : February 12, 2019
INVENTOR(S) : Nagesh Javali et al.

Page 1 of 1

It is certified that error appears in the above-identified patent and that said Letters Patent is hereby corrected as shown below:

In the Claims

Column 23, Line 40, "spooled" should be -- spoofed --;
Column 23, Line 67, ":" should be -- ; --;
Column 24, Line 44, "option- kind" should be -- option-kind --;
Column 25, Line 16, "fust" should be -- first --;
Column 25, Line 42, "die" should be -- the --;
Column 25, Line 46, "opiion" should be -- option --;
Column 26, Line 23, "thiixi" should be -- third --;
Column 27, Line 6, "thiixi" should be -- third --;
Column 28, Line 26, "thiixi" should be -- third --;
Column 28, Line 30, "option- data" should be -- option-data --;
Column 28, Line 41, "sixtlt" should be "sixth".

Signed and Sealed this
Fourteenth Day of May, 2019

Andrei Iancu
*Director of the United States Patent and Trademark Office*